United States Patent
Li et al.

(10) Patent No.: US 10,482,639 B2
(45) Date of Patent: Nov. 19, 2019

(54) DEEP HIGH-RESOLUTION STYLE SYNTHESIS

(71) Applicant: Adobe Inc., San Jose, CA (US)

(72) Inventors: Yijun Li, Merced, CA (US); Chen Fang, Sunnyvale, CA (US); Jimei Yang, Mountain View, CA (US); Zhaowen Wang, San Jose, CA (US); Xin Lu, Mountain View, CA (US)

(73) Assignee: Adobe Inc., San Jose, CA (US)

(*) Notice: Subject to any disclaimer, the term of this patent is extended or adjusted under 35 U.S.C. 154(b) by 26 days.

(21) Appl. No.: 15/438,147

(22) Filed: Feb. 21, 2017

(65) Prior Publication Data

US 2018/0240257 A1 Aug. 23, 2018

(51) Int. Cl.
| | | |
|---|---|---|
| G06T 11/60 | (2006.01) | |
| G06K 9/62 | (2006.01) | |
| G06K 9/46 | (2006.01) | |
| G06T 11/00 | (2006.01) | |

(52) U.S. Cl.
CPC ............ *G06T 11/60* (2013.01); *G06K 9/46* (2013.01); *G06K 9/6256* (2013.01); *G06T 11/001* (2013.01)

(58) Field of Classification Search
CPC ...... G06K 9/4652; G06K 9/52; G06K 9/6256; G06K 9/6267; G06K 9/66
See application file for complete search history.

(56) References Cited

U.S. PATENT DOCUMENTS

2018/0068463 A1* 3/2018 Risser .................. G06T 7/45

OTHER PUBLICATIONS

Gatys et al: "Image style transfer using convolution neural networks", Proceedings of the IEEE, 2016.*
Gatys et al., "Texture Synthesis Using Conventional Neural Networks", Advances in Neural Information Processing Systems 28 (NIPS 2015), 9 pages.
Johnson et al., "Perceptual Losses for Real-Time Style Transfer and Super-Resolution", arXiv:1603.08155 [cs.CV], Mar. 27, 2016, 18 pages.
Simonyan et al., "Very Deep Convolutional Networks for Large-Scale Image Recognition", arXiv:1409.1556v3 [cs.CV] Nov. 18, 2014.
Ulyanov et al., "Texture Networks: Feed-ForwardSynthesis of Textures and Stylized Images", arXiv:1603.03417v1 [cs.CV] Mar. 10, 2016.

* cited by examiner

*Primary Examiner* — Ruiping Li
(74) *Attorney, Agent, or Firm* — Kilpatrick Townsend & Stockton LLP

(57) ABSTRACT

In some embodiments, techniques for synthesizing an image style based on a plurality of neural networks are described. A computer system selects a style image based on user input that identifies the style image. The computer system generates an image based on a generator neural network and a loss neural network. The generator neural network outputs the synthesized image based on a noise vector and the style image and is trained based on style features generated from the loss neural network. The loss neural network outputs the style features based on a training image. The training image and the style image have a same resolution. The style features are generated at different resolutions of the training image. The computer system provides the synthesized image to a user device in response to the user input.

20 Claims, 8 Drawing Sheets

DEEP HIGH-RESOLUTION STYLE SYNTHESIS

TECHNICAL FIELD

The application relates to synthesizing an image style using a plurality of neural networks, where the synthesized image can be generated and output from a content application.

BACKGROUND

Content applications are popularly used to create digital content. Certain content applications are designed to synthesize high resolution images that share the same style with a high resolution style image. In other words, a content application can transfer the artistic style, e.g., visual properties, of the artwork shown in a style image to a synthesized image. For example, the style image can be an image of a work of art, such as an image of the Starry Night painting by Van Gogh. Continuing with this example, the synthesized image can be an image of a scene depicting a cloudy day. The artistic style elements, such as brushes, strokes, and patterns, of the Starry Night painting are used as the style that is transferred to the cloudy day image to create the synthesized high resolution image.

Existing content applications use deep neural networks to synthesize an image with a desired artistic style. Typically, a deep neural network is trained at a particular image resolution. That is, the training images are style images having the particular image resolution. Either, a low image resolution (e.g., 256 pixel resolution in width) or a high image resolution (e.g., 1024 pixel resolution in width) is used in prior art solutions.

SUMMARY

Embodiments of the present disclosure include synthesizing an image style based on a plurality of neural networks. In an example, a first "generator" neural network is trained using a second pre-trained "loss" neural network. The training implements a multiple scale style loss approach. More specifically, the generator neural network is trained by outputting style features from the loss neural network at different image resolutions and computing style losses at the different image resolutions. The parameters of the generator neural network are iteratively updated through backpropagation to minimize the style losses. Once trained, the generator neural network can extract global style features and local style features from a given style image because of the training at the multiple image resolutions.

In an example, a computer system hosts the generator neural network. The computer system receives user input from a user device. The user input identifies a particular high resolution style image. The computer system generates a noise vector from this style image and inputs the noise vector to the generator neural network. In response, the computer system receives an image that shares the global and local styles of the high resolution style image. This image is then provided to the user device for presentation at a user interface. Because the provided image includes the global and local styles, the quality of service associated with synthesizing an image style is improved relative to existing solutions.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
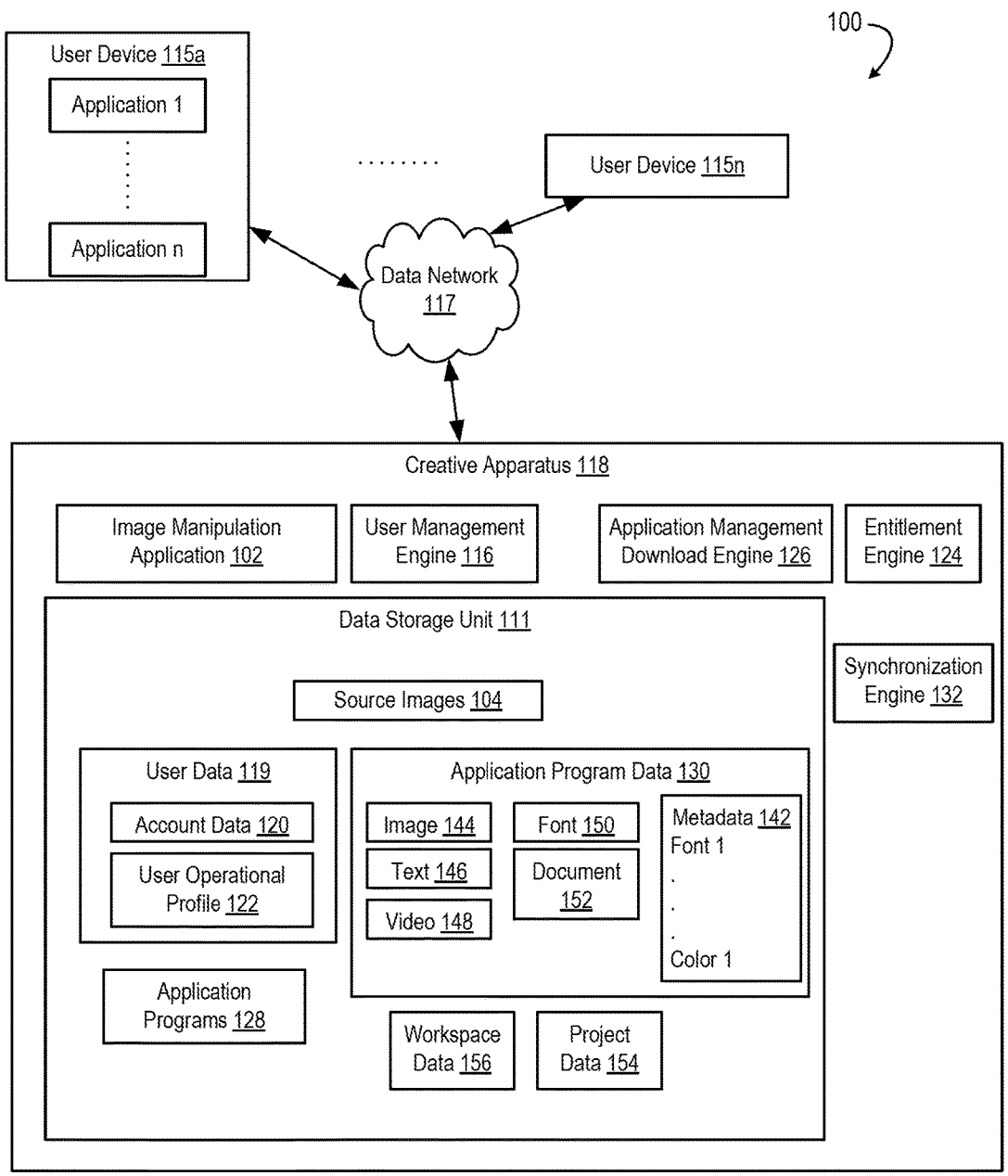
FIG. 1 is a diagram depicting an example of a network environment 100 for using a content application that synthesizes images having a particular style of interest, according to certain embodiments.

The present disclosure describes systems and methods for synthesizing an image style based on a plurality of neural networks. A content application is accessible to or hosted on a user device, such as a personal computer or other computing device. The content application has access to a library of high resolution style images, such as stock images of artworks captured at a resolution exceeding 1024 pixels in width. User input is received to select one of the high resolution style images. In turn, the content application synthesizes an image that shares the style of the selected style image. The synthesized image includes both the global style and local style of the selected style image. Hence, the quality of service of the content application (e.g., quality of the synthesized images) is higher relatively to existing content applications that transfer only one of the global style and local style.

In an example embodiment, a plurality of neural networks are implemented. One of such networks is a generator neural network that synthesizes the image based on the selected style image. This neural network is trained using another neural network, referred to herein as a loss neural network. The loss neural network is pre-trained to generate features that identify the styles in a given image, referred to herein as style features. Pre-trained refers to the loss neural network being already trained prior to the training of the generator neural network.

The training of the generator neural network relies on a multiple scale style loss approach. Under this approach, the loss neural network outputs style features at different image resolutions. Generally, style features output at lower resolutions indicate global styles, whereas style features output at higher resolutions indicate local styles. A global style can represent the salient artistic properties across the style image, such as the circular wavy patterns of the Starry Night painting. In comparison, a local style can represent detailed artistic properties particular to a sub-area of the style image, such as the local strokes, brushes, and canvas patterns of the Starry Night painting. Losses are computed at different images resolutions given the corresponding style features. Through backpropagation, parameters of the generator neural network are iteratively updated to minimize the losses. Once the training is complete, the generator neural network can be used by the content application. The loss neural network is used for only the training of the generator neural network.

More specifically, during the training of the generator neural network, high resolution training images are used, such as style images at a 1024 pixel resolution in width (or higher). From each training image, the generator neural network generates intermediate images at different resolutions. The resolutions are lower or equal to the resolution of the training image. For example, three intermediate images are generated at 256, 512, and 1024 pixel resolutions in width. Each of such intermediate images is input to the loss neural network to output style features at the respective resolutions (e.g., style features at the 256 pixel resolution, style features at the 512 pixel resolution, and style features at the 1024 pixel resolutions). These style features are referred to herein as "intermediate style features" for ease of reference. Similarly, the training image is sub-sampled to the different resolutions (e.g., to the 256 and 512 pixel resolutions), resulting in sub-sampled training images. These images and the training image (at the original high resolution) are input to the loss neural network to output respective style features at the different resolutions, referred to herein as "training style features" for ease of reference. For each resolution, a loss is computed between the intermediate style features and the training style features at that resolution. For example, a loss at the 256 resolution, a loss at the 512 resolution, and a loss at the 1024 resolution are computed. The losses are used to update the parameters of the generator neural network. In this way, training images at a high resolution (e.g., 1024 pixel resolution) are used to train the generator neural network at various image resolutions (e.g., 256, 512, and 1024 pixel resolutions). Because lower resolutions indicate global styles and high resolutions indicate local styles, the generator neural network is trained to synthesize an image that includes both the global and local styles of a style image.

The multiple scale style loss of the present disclosure provides various technical improvements over existing systems. To better understand these improvements, example implementations of the existing systems are described herein next.

Generally, existing system implement a deep neural network that is trained at a particular image resolution. That is, the training images are style images having the particular image resolution. Either, a low image resolution or a high image resolution is used in prior art solutions.

With low image resolution training, the trained deep neural network is capable of extracting and transferring a global style from a style image to the synthesized image. On the other hand, with high image resolution training, the trained deep neural network is capable of extracting and transferring a local style from the style image. Because the training does not use both low and high image resolutions, the existing deep neural networks, and equivalently, content applications that rely on them, are incapable of synthesizing an image that shares both the global style and the local style of a style image, unless the neural network is trained over multiple data sets, each specific to a particular resolution. The quality of the synthesized images can thus be limited.

Various reasons exist for limiting the training to either low or high image resolutions. One of the reasons relates to the architecture of the existing deep neural networks, where the input thereto (including the training images during the training) is limited to one particular resolution. Another reason relates to the computational complexity of using multiple resolutions.

Relative to the existing systems, the multiple scale style loss of the present disclosure provides various technical improvements. For example, the quality of the synthesized images is improved because such images include global and local styles. Further, while one data set of training images at a high resolution is used, low resolution styles are still captured. Thus, there is no need to train over multiple data sets, each being specific to a particular resolution. By using one data set, as opposed to multiple ones, the computational efficiency for training the generator neural network can be increased.

Generally, the generator neural network can be trained for style synthesis and style transfer. Style synthesis refers to generating a new image that shares the style (global and local) of a particular style image. For example, out of the Starry Night painting, the new image would have similar content (e.g., night colors with bright spots) generated with the artistic style of Van Gogh in that painting. Style transfer refers to transferring the style from the particular style image to an existing image, where content of the existing image is typically preserved and modified according to the style. For example, the image of the Starry Night painting can be the style image. The existing image can be of a cloudy day. A new image is synthesized for a cloudy day having the artistic style of Van Gogh in the Starry Night painting.

In the interest of clarity of explanation, many of the embodiments of the present disclosure are described in connection with the style synthesis. However, the embodiments are not limited as such and similarly apply to the style transfer. Implementation differences between the two functionalities are described herein below. Generally, style synthesis relies on a computation of losses based on style features generated by the loss neural network, referred to herein as "style losses." Style transfer additionally relies on a computation of losses based on content features generated by the loss neural network, referred to herein as "content losses." A content feature is a feature that indicates a particular portion of the content, such as an object or portion of the object present in the content (e.g., indicates a star, in the Starry Night paining). The content losses and style losses can be weighted to generate weighted losses, which are then used to update parameters of the generator neural network during the training for the style transfer. Also in the interest of clarity of explanation, various embodiments are described in connection with training a generator neural network using training images having 1024 pixel resolution in width. However, other image resolutions may be used.

As used herein, the term "style image" refers to a high resolution image that includes a style of interest, such as an image of an artwork at a resolution exceeding 1024 pixels in width. A "style" refers to a visual property of the style image, such as the artistic style of the artwork. A "global style" refers to the salient visual properties across the style image, such as the salient artistic style of the artwork (e.g., circular wavy patterns of the Starry Night). A "local style" refers to detailed visual properties particular to a sub-area of the style image, such as the detailed artistic properties local to a portion of the artwork (e.g., strokes, brushes, and canvas patterns in a sub-area of the Starry Night). A "synthesized image" refers to an image generated based on at least a style image, where the synthesized image includes the global and local styles of the style image. Additionally, the synthesized image can be generated based on a content image such that the synthesized image includes content from the content image.

As used herein, the term "generator neural network" refers to a neural network trained to generate a set of features (e.g., a feature map) of an image. The term "loss neural network" refers to a neural network pre-trained to generate at least A set of style features (e.g., a style feature map) of an image. In the context of style transfer, the loss neural network is also pre-trained to generate content feature (e.g., a content feature map). A "style feature" refers to a feature that provides information about a style of the image. A "content feature" refers to a feature that provides information about content of the image.

Referring now to the drawings, FIG. 1 is a diagram depicting an example of a network environment 100 for using a content application that synthesizes images having a particular style of interest, according to certain embodiments. In the example depicted in FIG. 1, an image manipulation application 102 is depicted as an example of the content application. The image manipulation application 102 uses a generator neural network for the style synthesis and/or style transfer. The generator neural network is trained using a loss neural network, where the training adopts the multiple scale loss approach.

In some embodiments, the image manipulation application 102 is executed by a creative apparatus 118 using data stored on a data storage unit 111 (e.g., one or more of the source images 104). In additional or alternative embodiments, the image manipulation application 102 is executed by another device, such as a user device 115a, using data stored on a data storage unit 111 (e.g., a data storage unit storing one or more of the source images 104) or data stored on another non-transitory, computer-readable medium (e.g., a non-transitory, computer-readable medium storing one or more of the source images 104).

In some embodiments, the environment 100 includes user devices, such as user devices 115a-n. Each of the user devices is connected to either a creative apparatus 118 or a marketing apparatus, or both, via a data network 117. A user of the user devices uses various products, applications, or services supported by the creative apparatus 118 via the data network 117.

The user devices 115a-n correspond to various users. Examples of the users include, but are not limited to, creative professionals or hobbyists who use creative tools to generate, edit, track, or manage creative content; marketing professionals who use marketing tools to generate, edit, track, or manage online content or online marking processes; end users; administrators; users who use image tools to create, edit, track, or manage images, advertisers, publishers, developers, content owners, content managers, content creators, content viewers, content consumers, designers, editors, any combination of these users; or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, a smartphone, a mobile phone, a tablet computer, a desktop computer, a processing unit, any combination of these devices, or any other suitable device having one or more processors. Each user device includes at least one application supported by the creative apparatus 118. It is to be appreciated that following description is now explained using the user device 115a as an example and any other user device can be used. Examples of the data network 117 include, but are not limited to, internet, local area network (LAN), wireless area network, wired area network, wide area network, and the like.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from the creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the engines of the creative apparatus 118.

In some embodiments, a user of the user device 115a visits a webpage or an application store to explore applications supported by the creative apparatus 118 (e.g., the image manipulation application 102). The creative apparatus 118 provides the applications (e.g., the image manipulation application 102) as a software as a service (SaaS), or as a standalone application that can be installed on the user device 115a, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, subscription accounts, and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e., free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application management download engine 126. Application installers or application programs 128, which may include a copy of the image manipulation application 102 or other software usable with the image to perform operations described herein, are present in the data storage unit 111 and are fetched by the application management download engine 126. These application are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128 or the applications that the user wants to download. The application programs 128 are downloaded on the user device 115a by the application manager via the application management download engine 126. Corresponding data regarding the download is also updated in the user operational profile 122. An application programs 128 is an example of a digital tool. The application management download engine 126 also manages a process of providing updates to the user device 115a.

In some embodiments, upon download, installation, and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects, or the assets are then stored as application program data 130 in the data storage unit 111 by a synchronization engine 132. The application program data 130 can be specific to the user or can be shared with other users based on rights management.

In some embodiments, the application program data 130 includes one or more assets. The assets can be a shared asset that the user wants to share with other users or that the user wants to offer on a marketplace. The assets can also be shared across multiple application programs 128. In some embodiments, each asset includes metadata 142. Examples of the metadata 142 include, but are not limited to, font, color, size, shape, coordinate, a combination of any of these, and the like.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In some embodiments, the project data 154 includes the assets. In additional or alternative embodiments, the assets are standalone assets. Similarly, the workspace data 156 can be part of the project data 154 in some embodiments and may be standalone data in other embodiments.

In some embodiments, the user can have one or more user devices. The application program data 130 is accessible by the user from any device, including a device that was not used to create the assets. This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in, then a newly created asset or updates to the application program data 130 are provided in real time. The workspace data 156 enables the synchronization engine 132 to provide same workspace configuration to the user on any other device or to the other user based on rights management data.

Figure 2:
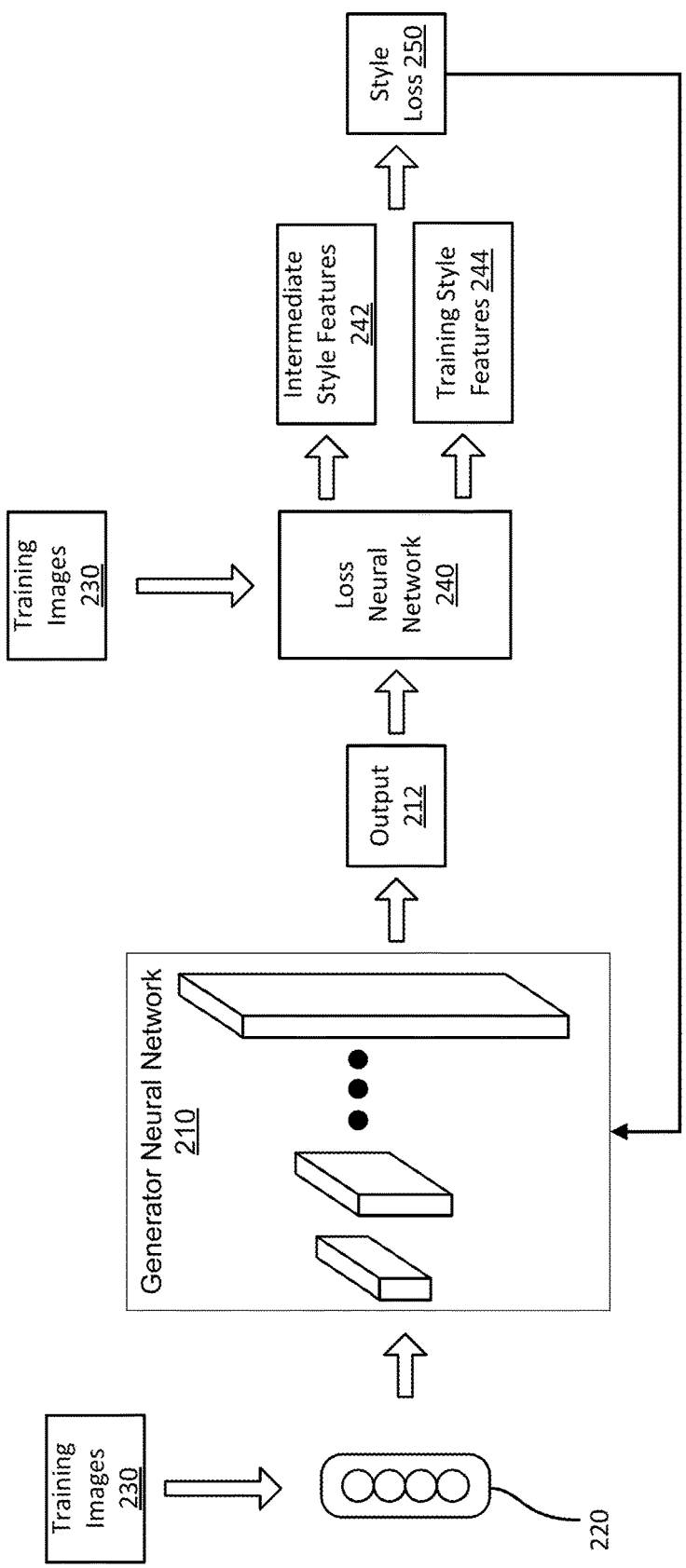
FIG. 2 illustrates an example of a prior art environment for training a generator neural network.

FIG. 2 illustrates an example of a prior art environment for training a generator neural network 210. This environment includes a computer system that hosts the generator neural network 210. The generator neural network 210 includes a deep neural network that produces images as output using feed-forward calculations from a noise vector. The generator neural network 210 is trained using a set of training images 230 and output from a loss neural network 240. The loss neural network 240 is pre-trained to output style features, where this training may, but need not, use the same set of training images 230 and occurs prior to the training of the generator neural network 210. The training images 230 have a particular resolutions, such as a 1024 pixel resolution. The computer system generates noise vectors 220 from the training images 230 and input them to the generator neural network 210. For example, an input noise vector is a random seed from a particular training image. A loss for the pair of the input noise vector and the particular training image is computed and used to update the parameters of the generator neural network 210 such that the loss is minimized.

More specifically, the generator neural network 210 outputs an image, referred to herein as an intermediate output 212, based on the input noise vector. The intermediate output 212 then becomes an input to the loss neural network 240. In turn, the loss neural network 240 outputs style features of the intermediate output 212, referred to herein as intermediate style features 242. Similarly, the particular training image corresponding to the noise vector is also an input to the loss neural network 240. In turn, the loss neural network 240 outputs style features for that image, referred to herein as training images style features 244. A style loss 250 is computed based on a comparison of the intermediate style features 242 and the training style features 244. The style loss 250 is provided as feedback to the generator neural network 210, where the feedback is used to update the parameters of this network 210.

An example of this prior art training is described in "Texture Networks: Feed-forward Synthesis of Textures and Stylized Images," to Dmitry Ulyanov, Vadim Lebedev, Andrea Vedaldi, and Victor Lempitsky, published in the International Conference on Machine Learning (ICML), 2016. Of importance, the training uses a single resolution of training images 230. Therefore, once trained, the generator neural network 210 is capable of outputting images that have one style, either local or global depending on the training resolution (e.g., local style if 1024 pixel resolution was used).

Figure 3:
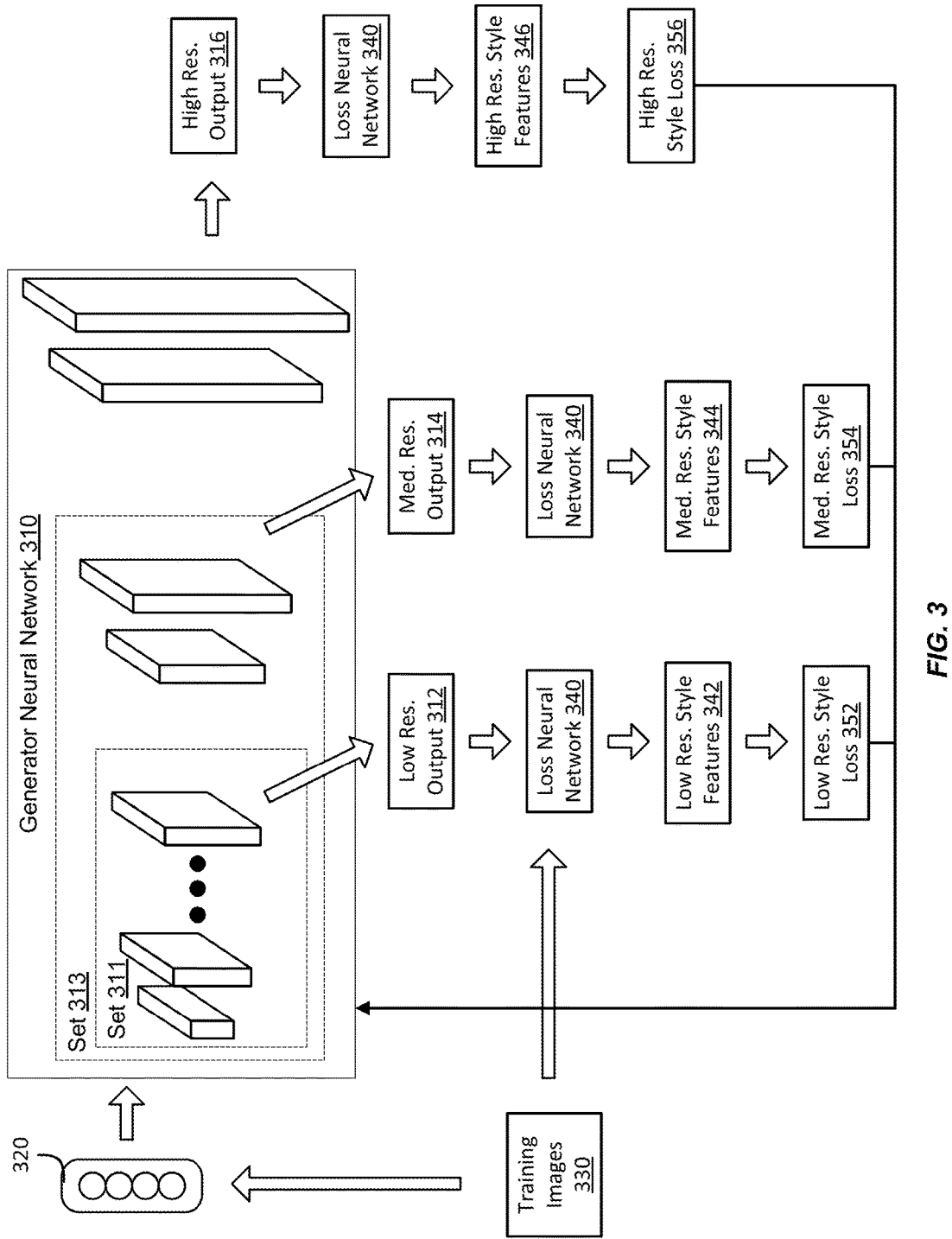
FIG. 3 illustrates an example of an environment for training a generator neural network based on multiple image resolutions, according to certain embodiments.

FIG. 3 illustrates an example of an environment for training a generator neural network 310 based on multiple image resolutions, according to certain embodiments. The environment implements the multiple scale style loss approach. Various components of this environment, including the generator neural network 310 and a loss neural network 340, which can be hosted by one or more computer system(s), such as the creative apparatus 118 of FIG. 1 and/or the user device 115. A content application, such as the manipulation application 102 of FIG. 1, can use (e.g., provide input to and receive output from) the generator neural network 310 to perform style synthesis and/or style transfer.

The training of the generator neural network 310 relies on the multiple scale style loss approach, where the loss neural network 340 is used to output at least style features at different image resolutions. These style features are used to compute style losses at the different resolutions, which may subsequently be used in style synthesis and style transfer operations. The parameters of the generator neural network 310 are iteratively updated through backpropagation to minimize the style losses. For style transfer, the loss neural network 340 also outputs content features at the different image resolutions. Content losses are computed accordingly and used for the backpropagation.

More specifically, noise vectors 320 are generated from training images 330 and are input to the generator neural network 310. The training images 330 include or consist of high resolution style images. The generator neural network 310 includes multiple layers that can be organized in sets of layers 311, 313. Each set 311, 313 includes a number of up-sampling, convolutional, and data transformation layers that apply non-linear data transformation to the input data. The different sets of layers 311, 313 can output intermediate images at different resolutions.

FIG. 3 illustrates an example of the generator neural network 310 three outputs at three resolutions: low resolution (e.g., 256 pixels in width), medium resolution (e.g., 512 pixels in width), and high resolution (e.g., 1024 pixels in width). FIG. 3 shows these three outputs as low resolution output 312, medium resolution output 314, and high resolution output 316, respectively. However, the generator neural network 310 can be configured to generate outputs at other resolutions and/or a larger or smaller number of outputs, where the smallest number should be two. Each of the outputs can be expressed as a three dimensional matrix that stores information about an image. One dimension corresponds to the horizontal resolution of the image, another dimension corresponds to the vertical resolution of the image, and the third dimension corresponds to the RGB properties of the image. Because the first two outputs 312 and 314 have a lower resolution than the training image, the corresponding images can be referred to as intermediate images. In comparison, the image defined by the high resolution output 316 corresponds to a high resolution image (e.g., the image that would be used for the style synthesis, once the training is complete). For each intermediate resolution, a set of the layers 311, 313 of the generator neural network 310 is used to generate the output at the resolution that the set of layers 311, 313 were configured to produce. For the high resolution, the full set of layers of the generator neural network 310 is used to generate the output. The outputs 312-316 then become input to the loss neural network 340, which subsequently computes style losses. The style losses are fed back into the generator neural network 310 and are used to update the parameters of the generator neural network 310 accordingly. This update can use a backpropagation algorithm to iteratively update the parameters and minimize the style losses.

For example, a first set 311 of up-sampling, convolutional, and data transformation layers generates the low resolution output 312. This output 312 can be expressed as a 256×256×3 matrix, where the first dimension, second dimension, and third dimension capture the horizontal resolution, the vertical resolution, and the RGB properties, respectively. Likewise, a second 313 set of up-sampling, convolutional, and data transformation layers generates the medium resolution output 314. The second set 313 of layers include the first set 311. This layering (e.g., set 313 containing set 311) can be repeated for higher resolutions, until the high resolution of the training images 330 is reached (e.g., up to 1024 pixel resolution in width). The set of layers corresponding to the highest resolution is typically the full set of layers of the generator neural network 310. In other words, the generator neural network 310 generates the high resolution output 316.

During training, the low resolution output 312, medium resolution output 314, and high resolution output 316 are input to the loss neural network 340. The loss neural network 340 includes a multi-layer neural network pre-trained to generate style features. Accordingly, the loss neural network 340 outputs style features at the different image resolutions (e.g., the 256, 512, and 1024 image resolutions). In other words, low resolution style features 342 are output and correspond to the low resolution output 312. These style features typically provide information about global style because of the low resolution and collectively represent a feature map of style features at that resolution. Similarly, medium resolution style features 344 and high resolution style features 346 are output and correspond to the medium resolution output 314 and the high resolution output 316, respectively. The high resolution style features 346 typically provide information about the local style because of the high resolution. The medium resolution style features 344 typically provide partial information about the global and local styles because of the medium resolution.

The training images 330 are also input to the loss neural network 340. In turn, the loss neural network 340 also outputs style features from these images 330 at the different resolution. These style features and the ones generated for the outputs 312-316 are used to compute style losses at the different resolutions.

For example, a particular training image 330 is used to generate the outputs 312-316 at the different resolutions by the generator neural network 310, which are used by the loss neural network 340 to subsequently generate low, medium, and high resolution style features 342, 344, 346. That particular training image 330 is also input to the loss neural network 340, which uses the training image to generate additional low, medium, and high resolution features. The low resolution style features of the low resolution output 312 (e.g., the corresponding low resolution style features 342) are compared to the low resolution style features of the training image to compute a low resolution style loss 352. Similarly, the medium resolution style features of the medium resolution output 314 (e.g., the corresponding medium resolution style features 344) are compared to the medium resolution style features of the training image to compute a medium resolution style loss 354. Likewise, the high resolution style features of the high resolution output 316 (e.g., the corresponding high resolution style features 346) are compared to the high resolution style features of the training image to compute a high resolution style loss 356. The computations of the low, medium, and high style losses 352, 354, 356 can occur in parallel or in serial. Example of a computation of the loss is further illustrated in FIG. 4. The losses 352, 354, 356 are then used to update the parameters of the generator neural network 310. For example, backpropagation can be implemented to iteratively update the parameters such that the losses 352, 354, 356 are minimized. An example of the backpropagation is further described in connection with FIG. 5.

Although FIG. 3 illustrates a single loss neural network 340 (e.g., illustrated as three instances of the same loss neural network 340), a different number of such neural networks can also be used. For example, one loss neural network can be used per image resolution, where this network is pre-trained at that image resolution.

When training the generator neural network 310 to perform style transfer operations, content losses are computed at the different resolutions in addition to the style losses. The content loss computation is performed similarly to the style loss computation. More specifically, the loss neural network 340 is pre-trained to generate content features. The training images 330 would include content images, in addition to the high resolution style images. Whereas the computer system generates noise vectors from the style images and inputs these vectors to the generator neural network 310, the computer system inputs the content images to the generator neural network 310. In turn, the generator neural network generates outputs at the different resolutions, where the outputs includes content from the content images. The content images are also separately input to the loss neural network 340 to generate content features at the different resolutions. Content features of the outputs from the generator neural network 310 and of the content images are compared across the different resolutions to compute content losses at these resolutions (e.g., three content losses at the 256, 512, and 1024 image resolutions, respectively). The content losses are then used for the backpropagation to update then parameters of the generator neural network 310. In an example, the content loss and the style loss are combined at each resolution. The combination can be accomplished using a weighted function to compute a weighted loss at that resolution. The weighted losses across the different resolutions are then used for the backpropagation to the generator neural network 310.

Unlike the prior art environment of FIG. 2, the generator neural network 310 is trained at different image resolutions, despite the one image resolution of the training images 330. Once trained, the generator neural network 310 includes a multi-layer neural network that synthesizes images sharing global and local styles with high resolution style images. Such style images may be available from a data store, such as from the data storage unit 111 of FIG. 1. Once a particular high resolution style image is selected by a content application interfacing with the generator neural network 310, a noise vector is generated by the content application. This noise vector can be a random vector that includes a subset of the features of the selected style image. The size of the subset can be predefined and is generally in the range of about four to about twenty features. For style synthesis, the noise vector is input to the generator neural network 310 that, in turn, outputs a synthesized image having the global and local styles of the selected style image. For style transfer, a content image is selected and provided as input by the content application, in addition to the noise vector, to the generator neural network 310. The generator neural network 310 outputs a synthesized image that includes the content of the selected content image while also having the global and local styles of the selected style image.

Figure 4:
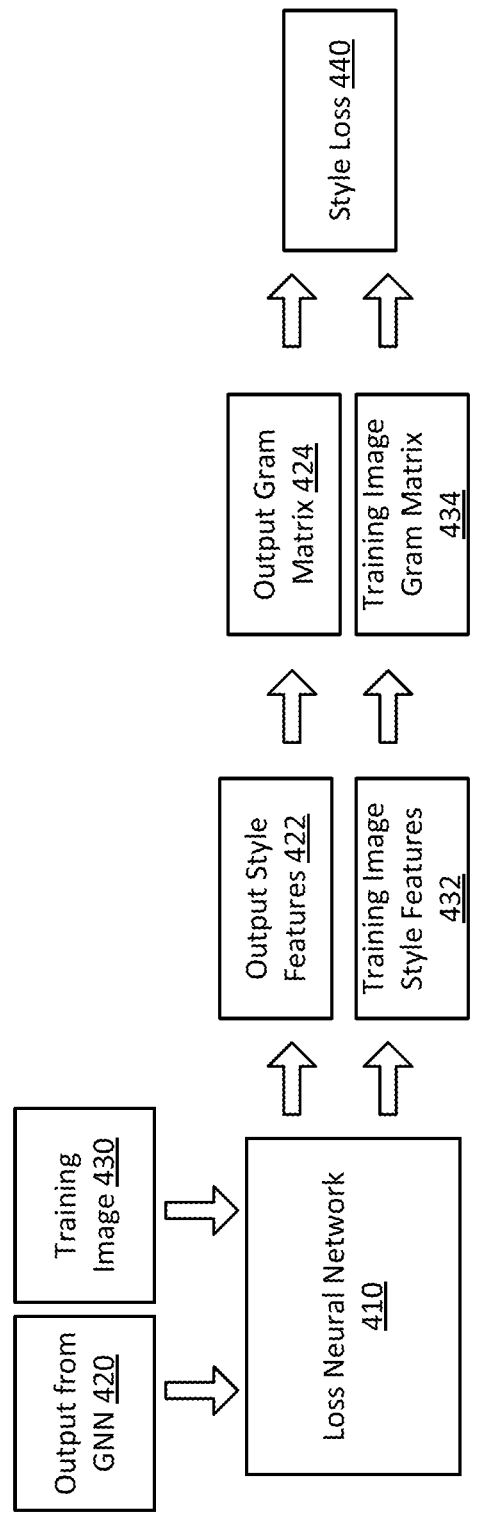
FIG. 4 illustrates an example of computing a style loss, according to certain embodiments.

FIG. 4 illustrates an example of computing a style loss, according to certain embodiments. The style loss can be computed at a particular image resolution based on a loss neural network 410 pre-trained to generate style features.

In an example, an output 420 from a generator neural network (e.g., the generator neural network 310 of FIG. 3) and a training image 430 are input to the loss neural network 410. The output 420 is generated at the particular image resolution from the generator neural network during training of the generator neural network. This generator neural network generates the output 320 from a noise vector seeded from features of the training image 430. Because the training image 430 can have a higher image resolution than the output 420 (e.g., 1024 and 256 pixel resolutions, respectively), the training image 430 would be down-sampled to the lower resolution of the output 420. The down-sampled image, instead of the original training image 430, would in that case be input to the loss neural network 410.

From the output 420, the loss neural network 410 generates style features, referred to herein as output style features 422. These style features 422 provide information about an image style (global or local depending on the image resolution) and collectively represent a style feature map. Similarly, out of the training image 430, the loss neural network 410 outputs style features, referred to herein as training image style features 432. These style features 432 also provide information about an image style (global or local depending on the image resolution). The purpose of the training phase for the generator neural network is to minimize the discrepancies between the two style features 422 and 432. The more the two style features 422 and 432 match, the more refined the parameters of the generator neural network are. That is because, optimally, the style recognized by the generator neural network (e.g., as found in the output style features 422) should be the same style of the training image (e.g., as found in the training image style features 432). Hence, the training phase for the generator neural network iteratively updates its parameters to minimize the discrepancy between or to best match the output style features 422 and the training image style features 432. One example of an implementation to achieve this purpose is the use of a style loss 440 as a loss function, where a backpropagation algorithm is applied to update the parameters of the generator neural network in a way that minimizes the loss function.

To compute the style loss 440, a Gram matrix, referred to herein as an output Gram matrix 424, is generated from the output style features 422. For example, the output Gram matrix 424 may be generated based on inner products of these features. A similar Gram matrix is generated from the training image style features 432 and is referred to herein as a training image Gram matrix 434. The style loss 440 is computed as a distance between the two matrices 424 and 434, which may be expressed as a norm (induced, Euclidean, etc.) of the difference between the two matrices 424 and 434. The training phase for the generator neural network iteratively updates its parameters to minimize the style loss 440. Once the training is complete, the style loss 440 need no longer be used for style synthesis operations (and, likewise, for style transfer operations).

For style transfer operations, a content loss is computed in addition to the style loss 440. In this case, the loss neural network 410 outputs content features for an output of the generator neural network and content features for a content image. In this case, the output from the generator neural network is based on inputting the content image to the generator neural network, in addition to a noise vector. The content loss is generated based on a comparison of the two sets of features (e.g., as a distance between matrices that represent these two sets). The content loss is then used to fine tune the parameters of the generator neural network. Hence, the generator neural network is trained to output a synthesized style transfer image that is close in content to a content image and in style to a style image.

Figure 5:
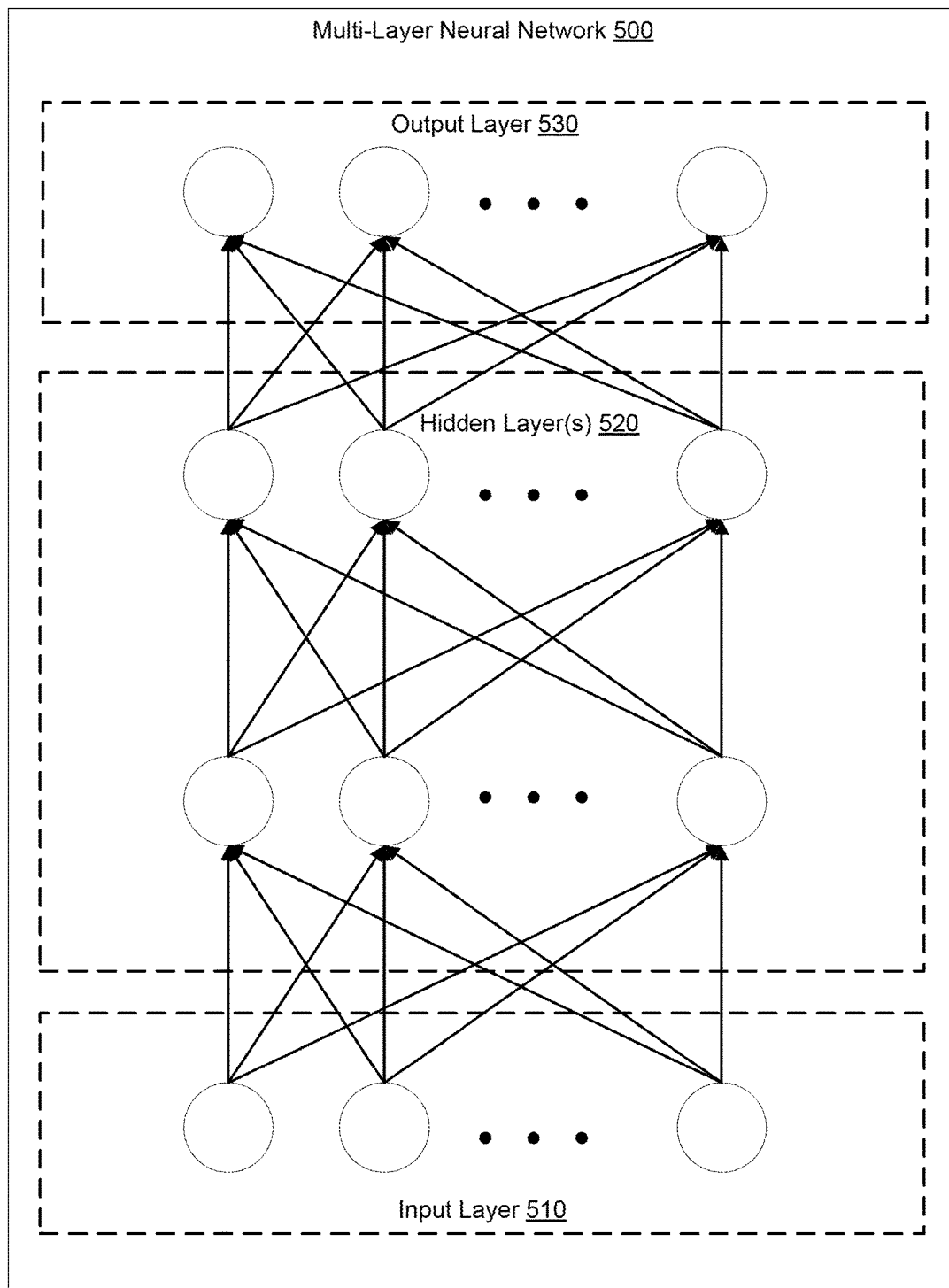
FIG. 5 illustrates an example of multi-layer neural network, according to certain embodiments.

FIG. 5 illustrates an example of multi-layer neural network 500, according to certain embodiments. A generator neural network and a loss neural network can have a similar architecture as the neural network 500.

Generally, the multi-layer neural network 500 represents a network of interconnected nodes, such as an artificial deep neural network, where knowledge about the nodes (e.g., information about specific features represented by the nodes) is shared across layers and knowledge specific to each layer is also retained. Each node represents a piece of information. Knowledge can be exchanged between nodes through node-to-node interconnections. Input to the multi-layer neural network 500 activates a set of node. In turn, this set of node activates other nodes, thereby propagating knowledge about the input. This activation process is repeated across other nodes until nodes in an output layer are selected and activated.

As illustrated, the multi-layer neural network 500 includes a hierarchy of layers representing a hierarchy of nodes interconnected in a feed-forward way. At the lowest hierarchy level, an input layer 510 exists. The input layer 510 includes a set of nodes that are referred to herein as input nodes. At the highest hierarch level, an output layer 530 exists. The output layer 530 is mapped to output nodes. Each output node provides information about a feature of an image (e.g., a style feature or a content feature). Thus, the example neural network is referred to as a multi-layer neural network.

A hidden layer 520 exists between the input layer 510 and the output layer 530. The hidden layer 520 includes "N" number of hidden layers, where "N" is an integer greater than or equal to one. In turn, each of the hidden layers also includes a set of nodes that are referred to herein as hidden nodes. Example hidden layers include up-sampling, convolutional, and data transformation layers.

At the lowest level of the hidden layer 520, hidden nodes of that layer are interconnected to the input nodes. At the highest level of the hidden layer 520, hidden nodes of that level are interconnected to the output node. The input nodes are not directly interconnected to the output nodes. If multiple hidden layers exist, the input nodes are interconnected to hidden nodes of the lowest hidden layer. In turn, these hidden nodes are interconnected to the hidden nodes of the next hidden layer and so on and so forth.

An interconnection represents a piece of information learned about the two interconnected nodes. The interconnection has a numeric weight that can be tuned (e.g., based on a training dataset), rendering the multi-layer neural network 500 adaptive to inputs and capable of learning.

Generally, the hidden layer 520 allows knowledge about the input nodes of the input layer 510 to be shared among the output nodes of the output layer 530. To do so, a transformation $f$ is applied to the input nodes through the hidden layer 520. In an example, the transformation $f$ is non-linear. Different non-linear transformations $f$ are available including, for instance, a rectifier function $f(x)=\max(0, x)$. In an example, a particular non-linear transformations $f$ is selected based on cross-validation. For example, given known example pairs $(x, y)$, where $x \in X$ and $y \in Y$, a function $f: X \to Y$ is selected when such a function results in the best matches.

The multi-layer neural network 500 also uses a loss function l (or, referred to also as a cost function c) to find an optimal solution. The optimal solution represents the situation where no solution has a loss less than the loss of the optimal solution. In an example, the loss function l includes a mean-squared error function that minimizes the average squared error between an output $f(x)$ and a target value y over all the example pairs $(x, y)$. Within the content of style features and content features, the loss function can be expressed as a style loss and/or a content loss. A backpropagation algorithm that uses gradient descent to minimize the loss function is used to train the multi-layer neural network 500.

As such, the hidden layer 520 retains knowledge about the input nodes. A set of knowledge is shared across the output nodes based on the interconnections of the hidden nodes and the input nodes.

Figure 6:
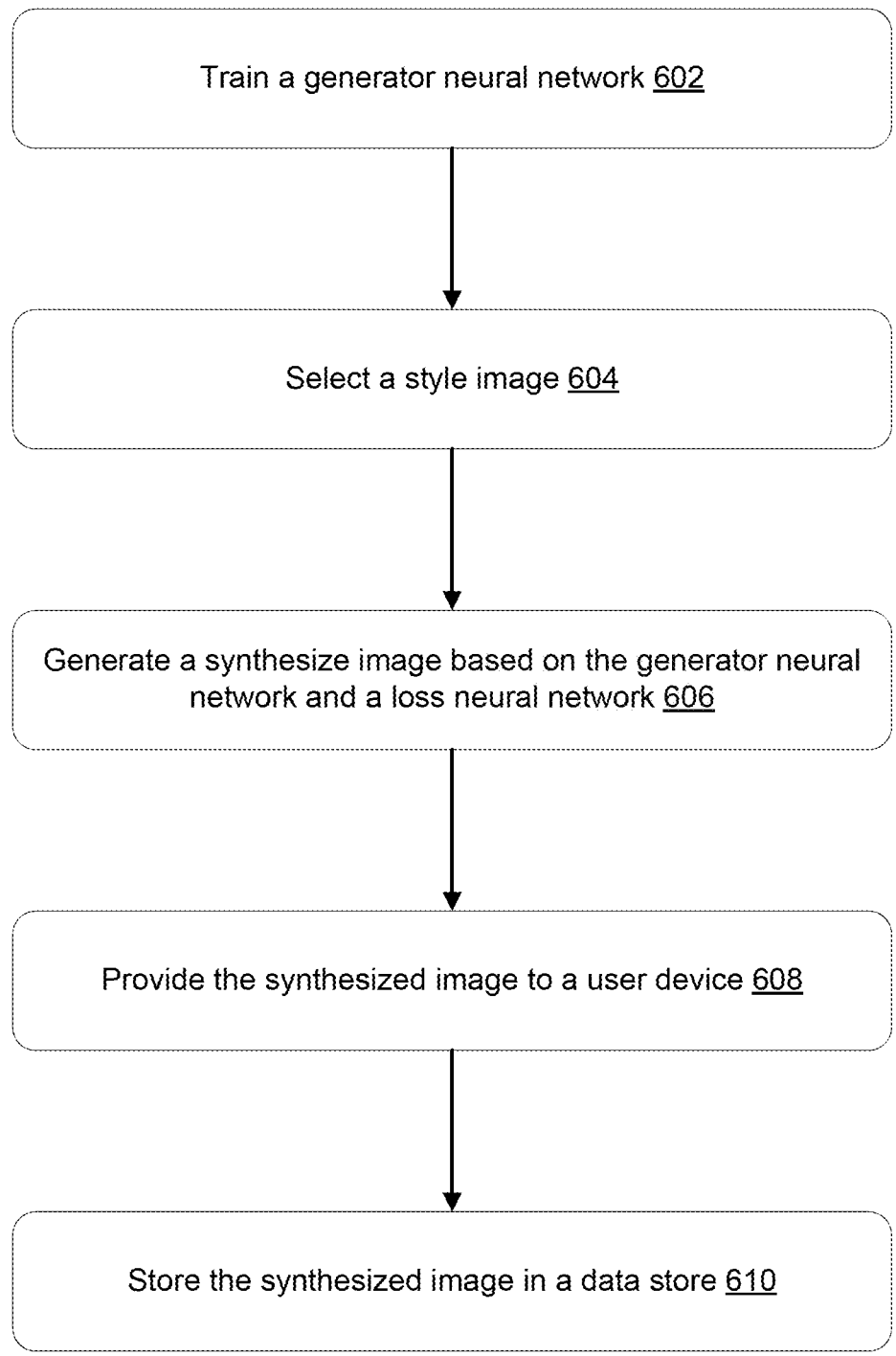
FIG. 6 illustrates an example of a flow for providing an image to a user device, where the image shares global and local style of a high resolution style image, according to certain embodiments.
Figure 7:
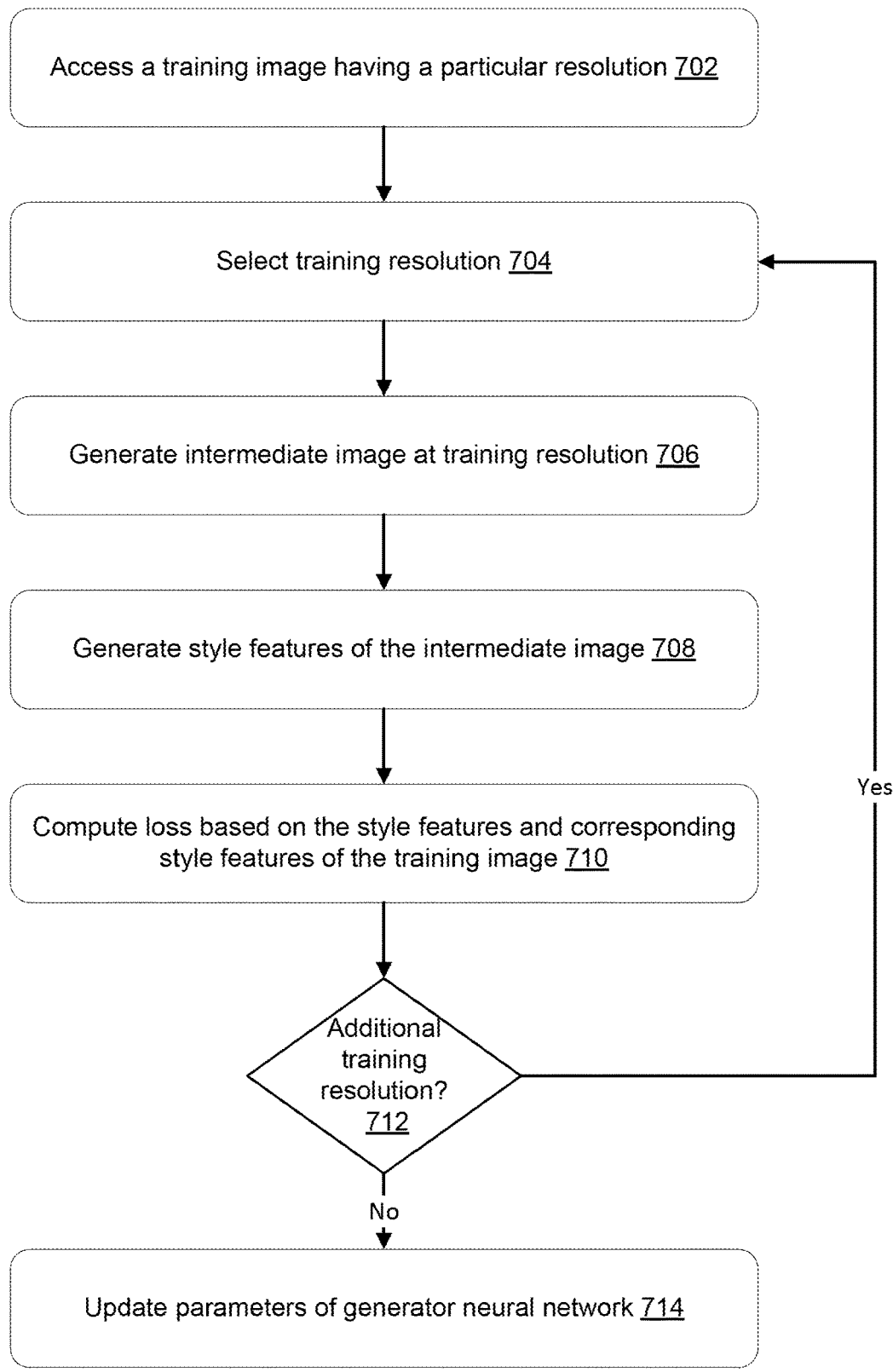
FIG. 7 illustrates an example of a flow for training a generator neural network based on multiple image resolutions, according to certain embodiments.

Turning to FIGS. 6-7, the figures illustrate example flows for synthesizing an image style based on a plurality of neural networks. A computer system may be configured to perform the illustrative flows. For example, the computer system can be a component of the creative apparatus 118 of FIG. 1 and can host a content application, such as the image manipulation application 102 of FIG. 1. The computer system may alternatively be the user device 115 shown in FIG. 1, in some embodiments. Instructions for performing the operations of the illustrative flows can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in figures and described herein. Each programmable module in combination with the processor represent a means for performing a respective operation(s). While the operations are illustrated in a particular order, it should be understood that no particular order is necessary and that one or more operations may be omitted, skipped, and/or reordered.

FIG. 6 illustrates an example of a flow for providing an image to a user device, where the image shares global and local styles of a high resolution style image, according to certain embodiments. In an example, style synthesis is performed where the provided image is randomly generated but includes the global and local styles of the high resolution style image. In another example, style transfer is performed where the provided image also shares the content of a given content image. For both style synthesis and style transfer, the flow starts at operation 602, where the computer system trains a generator neural network as discussed in detail above with reference to FIG. 3. In an example, the training follows a flow that implements a multiple scale style loss approach, as further illustrated in the flow of FIG. 7. Generally, a pre-trained loss neural network is used to train the generator neural network at different image resolutions such that the generator neural network is capable of extracting global and local style features from a given high resolution style image.

At operation 604, the computer system selects a style image. In an example, multiple style images are available from a data store, where each of these images is a high resolution image of an artwork. The computer system receives user input that identifies one of these high resolution style image and performs the selection accordingly. The user input may be provided via a user interface to the content application. The user interface can be hosted on the user device, such as a user device 115 of FIG. 1. when training the generator neural network to perform style transfer operations, the computer system also selects a content image. That content image can be available from the data store or uploaded from the user device. The selection can be performed in response to additional user input that identifies and/or provides the content image.

At operation 606, the computer system generates a synthesized image using the generator neural network and the loss neural network. In an example, the loss neural network is only used in the training of the generator neural network. In this example, once the parameters of the generator neural network are set, the computer system can use the trained generator neural network to generate the synthesized image. Once the training is complete and for style synthesis, the computer system generates a noise vector from the selected style image, such as a random seed of features of the style image. The noise vector is then input to the generator neural network. In response, the computer system receives the synthesized image. This image is output from the generator neural network and has the global and local styles of the selected style image. Similarly, after the training is complete and for style transfer, the computer system also inputs the content image to the generator neural network. In response, the computer system receives the synthesize image, where the synthesized image also includes the content of the content image.

At operation 608, the computer system provides the synthesized image to the user device. For example, the computer system transmits the synthesized image to the user device for presentation in the user interface. The user device may store the synthesized image. The user interface may support various functionalities for displaying and/or manipulating (e.g., editing) the image. In another example, the computer system is the user device. In this example, the synthesized image may simply be presented in the user interface.

At operation 610, the computer system stores the synthesized image in the data store. For example, the synthesized image can be linked to a user account associated with the user device or can be made available to other user accounts from the data store.

FIG. 7 illustrates an example of a flow for training the generator neural network based on multiple image resolutions, according to certain embodiments. The example flow starts at operation 702, where the computer system accesses a training image having a particular resolution, such as a high resolution equal or greater than 1024 pixels in width. The training image represents a style image.

At operation 704, the computer system selects a training resolution. For example, different image resolutions are available for selection, where these image resolutions are equal or smaller than the particular resolution of the training image. To illustrate, if the particular resolution is 1024 pixels in width, 256, 512, and 1024 pixel resolutions are available for selection. The selection can be sequential in an ascending or descending order or can be random. Generally, high image resolutions are usable to train the generator neural network to recognize local styles. In comparison, low image resolutions are usable to train the generator neural network to recognize global styles. Hence, at least two training resolutions should be selected: a high image resolution and a low image resolution to train the generator neural network to recognize both global and local styles.

At operation 706, the computer system generates an intermediate image at the training resolution. For example, the computer system generates a noise vector from the training image and inputs the noise vector to the generator neural network. A set of layers of the generator neural network configured for processing images having the selected training resolution outputs the intermediate image. The information about intermediate image can be defined or stored in a three dimensional matrix. The first two dimensions correspond to the horizontal and vertical resolutions of the intermediate image. The third dimensions correspond to the RGB properties of the intermediate image. (The set of layers can include up-sampling, convolutional, and data transformation layers.

At operation 708, the computer system generates style features of the intermediate image. For example, the computer system inputs the intermediate image to and, in response, receives from the loss neural network a feature map that includes the style features. The computer system can also separately input the training image to the loss neural network and receive another feature map that includes style features of the training image at the training resolution. Because the training image can have a higher image resolution than training resolution (e.g., 1024 and 256 pixel resolutions, respectively), the training image may need to be down-sampled to the training resolution before inputting it to the loss neural network.

At operation 710, the computer system computes a loss (e.g., a style loss) based on the style features of the intermediate image and the corresponding style features of the training image. In an example, a Gram matrix is computed for each set of style features (e.g., one for the intermediate image and one for training image, at the training resolution). The two Gram matrices are compared (e.g., using induced or Euclidean norms) to compute the style loss.

At operation 712, the computer system determines whether additional training resolutions are available for selection or not. As explained under operation 704, at least two training resolutions should preferably be used. Accordingly, the computer system the next training resolution, shown in FIG. 7 as a loop back from the operation 712 to the operation 704. In this way, the generator neural network is trained across all of the training resolutions, thereby enabling the generator neural network to extract global and local styles from a given style image. In other words, by iteratively performing operations 704 through 710, multiple intermediate images are generated (e.g., a first image, a second image, and a third image at the 256, 512, and 1024 pixel resolutions, respectively) and a set of style features and corresponding losses are computed for each intermediate image. The logical flow of FIG. 7 shows an example in which selection of different training resolutions occurs sequentially. However, it is to be understood that the illustrated sequence of operations is optional. In alternative embodiments, each of the desired training resolutions can be selected at once such that the generator neural network is trained across the different resolutions in parallel. In both examples, when no additional training resolution remains or is desirable for selection, operation 714 is performed.

At operation 714, the computer system updates parameters of the generator neural network based on the losses computed at the different training resolutions. For example, the losses are used as a loss function to fine tune the interconnections between the nodes of the generator neural network (e.g., the numeric weights of the interconnections) through backpropagation. More specifically, a backpropagation algorithm that uses gradient descent to minimize the loss function may be used to update the interconnections.

In an example, a first loss corresponds to a low training resolution (e.g., a 256 pixel resolution). A first set of layers of the generator neural network outputs the low resolution intermediate image, from which intermediate style features are derived to compute the first loss. Similarly, a second loss corresponds to a higher training resolution (e.g., a 512 or 1024 pixel resolution). A second set of layers of the generator neural network outputs the higher resolution intermediate image, from which intermediate style features are derived to compute the second loss. The second set of layers includes the first set. In this example, the first and second losses are used to fine tune the parameters of the first layer through backpropagation. However, the second loss and not the first loss, is used to fine tune the parameters of the second layer through backpropagation. The reason for this approach to update the parameters is that both sets of layers are used to compute the second loss, but only the first set is used to compute the first loss.

Although FIG. 7 illustrates a single training image, the computer system uses additional training images. Typically, the computer system iteratively repeats operation 702-714 across different training images at the particular selected training resolution (e.g., the high resolution) until convergence.

Further, although FIG. 7 is described in connection with training for style synthesis, the illustrative flow can similarly apply for style transfer. In particular, at operation 706, the computer system additionally inputs a selected content image to the generator neural network, such that the output intermediate image includes content from the selected content image. At operation 708, the computer system additionally inputs the selected content image to the loss neural network to generate content features. At operation 710, the computer system computes a content loss given the content features of the intermediate image and the content features of the content image. At operation 714, the computer system updates the parameters of the generator neural network based on the content loss. For example, the content loss can be weighted and combined with the style loss to compute a total loss. The total loss is then used for the backpropagation.

Figure 8:
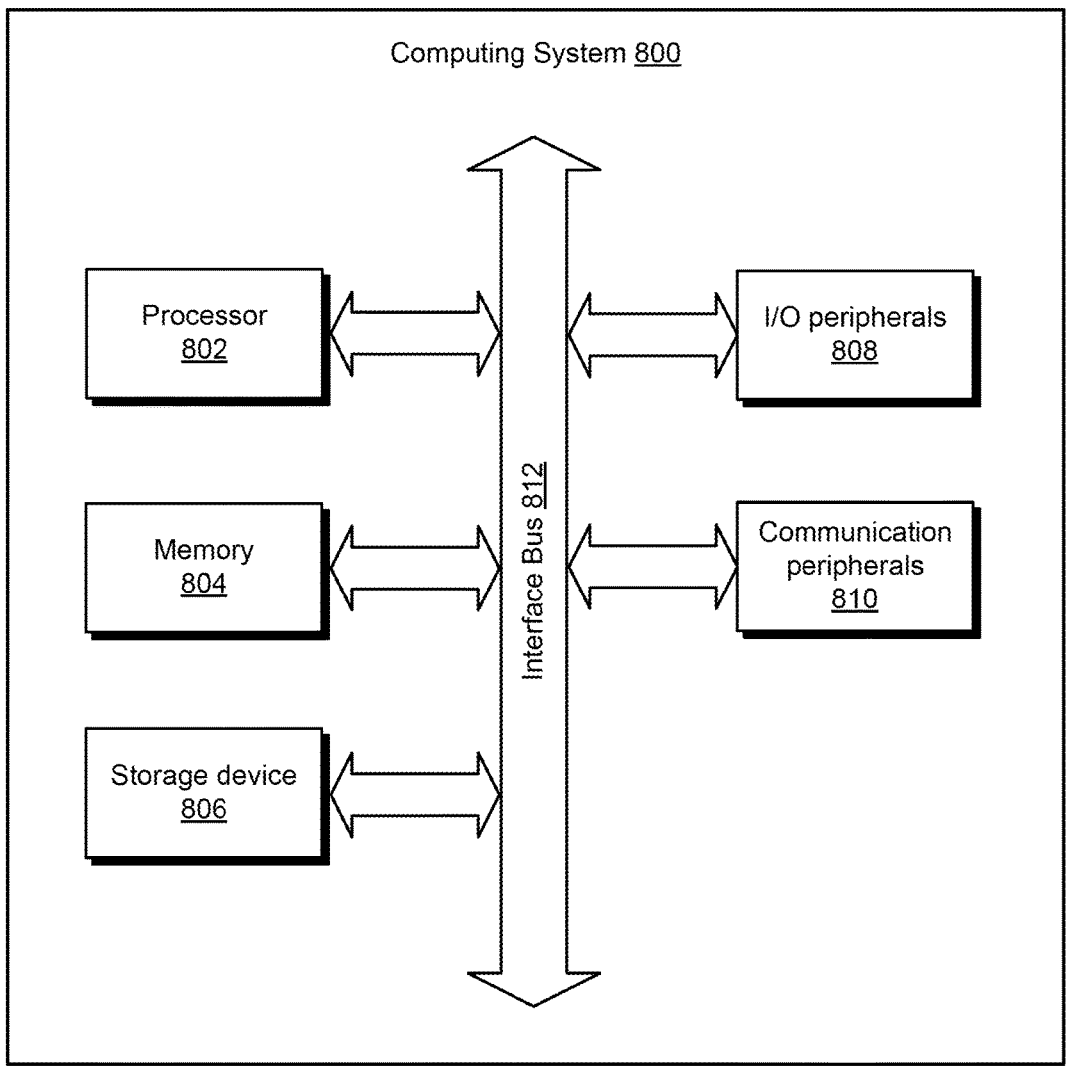
FIG. 8 illustrates examples of components of a computer system, according to certain embodiments.

FIG. 8 illustrates examples of components of a computer system 800, according to certain embodiments. The computer system 800 is an example of a system that hosts a generator neural network, a loss neural network, and a content application according to the functionalities described in connection with FIGS. 1-7. Although these components are illustrated as belonging to a same computer system 800, the computer system 800 can also be distributed.

The computer system 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computer system 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computer system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for synthesizing an image style based on a plurality of neural networks, the computer-implemented method comprising:
   selecting, by a computer system, a style image based on user input that identifies the style image;
   generating, by a generator neural network, a synthesized image based on the style image, wherein the generator neural network is a feed-forward generator neural network and is trained using a loss neural network by:
      generating, by different layers of the generator neural network and based on a training image, a first output image at a first resolution and a second output image at a second resolution, wherein the first resolution is smaller than the second resolution, the training image and the style image having a same resolution;
      applying the loss neural network to the first output image to generate a first set of output style features;
      applying the loss neural network to the second output image to generate a second set of output style features;
      generating a first set of training image style features and a second set of training image style features based on the training image and the loss neural network;
      determining, by the computer system, a first loss based on the first set of output style features and the first set of training image style features, and a second loss based on the second set of output style features and the second set of training image style features; and
      adjusting, by the computer system, parameters of different layers of the generator neural network based, at least in part, upon the first and the second losses; and
   providing, by the computer system, the synthesized image to a user device in response to the user input.

2. The computer-implemented method of claim 1, wherein the synthesized image and the style image have the same resolution, and wherein the synthesized image comprises global style properties and local style properties of the style image.

3. The computer-implemented method of claim 1, wherein the second output image at the same resolution of the training image.

4. The computer-implemented method of claim 1, wherein
   the generator neural network comprises a first set of layers that output the first output image and a second set of layers that output the second output image, the second set of layers comprising the first set of layers, and
   the parameters of the first set of layers of the generator neural network are updated based on the first loss and the second loss and the parameters of the second set of layers of the generator neural network are updated based on the second loss.

5. The computer-implemented method of claim 1, wherein the generator neural network transfers style properties of the style image to the synthesized image.

6. The computer-implemented method of claim 5, wherein the style image comprises an image of an artwork at a resolution greater than or equal to a 1024 pixel resolution, and wherein the style properties define visual aesthetics of the artwork.

7. The computer-implemented method of claim 1, wherein the generator neural network further generates the synthesized image based on additional user input that identifies a content image, wherein the synthesized image is generated by at least transferring style properties of the style image to the synthesized image and transferring content from the content image to the synthesized image.

8. The computer-implemented method of claim 7, wherein the generator neural network is trained by at least computing style losses and content losses at a lower resolution and a same resolution of the training image, and wherein the style losses and content losses are computed based on the sets of output style features generated by the loss neural network for the output images at different resolutions.

9. The computer-implemented method of claim 8, wherein the style losses and the content losses are weighted to generate a first total loss at the lower resolution and a second total loss at the resolution of the training image, and wherein the generator neural network is trained based on a backpropagation according to the first total loss and a backpropagation according to the second total loss.

10. A computer system for synthesizing an image style based on a plurality of neural networks, the computer system comprising:
means for selecting a style image based on user input that identifies the style image;
means for generating a synthesized image based on a generator neural network and a noise vector of the style image, wherein the generator neural network is a feed-forward generator neural network and is trained using a loss neural network by:
generating, by different layers of the generator neural network and based on a training image, a first output image at a first resolution and a second output image at a second resolution, wherein the first resolution is smaller than the second resolution;
applying the loss neural network to the first output image to generate a first set of output style features;
applying the loss neural network to the second output image to generate a second set of output style features;
generating a first set of training image style features and a second set of training image style features based on the training image and the loss neural network;
determining, by the computer system, a first loss based on the first set of output style features and the first set of training image style features, and a second loss based on the second set of output style features and the second set of training image style features; and
adjusting parameters of different layers of the generator neural network based, at least in part, upon the first and second losses; and
means for providing the synthesized image to a user device in response to the user input.

11. The computer system of claim 10, wherein the generator neural network comprises a multi-layer neural network trained to generate output images at different resolutions, wherein the multi-layer neural network comprises sets of up-sampling, convolutional, and data transformation layers.

12. The computer system of claim 11, wherein the loss neural network comprises a multi-layer neural network trained to generate style features based on training images.

13. The computer system of claim 10, wherein the style image and the training image have a 1024 pixel resolution, wherein the first set of output style features is generated at a resolution greater than or equal to a 256 pixel resolution, wherein the second set of output style features is generated at a resolution greater than or equal to a 512 pixel resolution, and wherein a third set of output style features is generated at a resolution greater than or equal to the 1024 pixel resolution.

14. The computer system of claim 10, wherein the noise vector comprises a random vector that includes a random subset of features of the style image.

15. A non-transitory computer-readable storage medium storing instructions that, upon execution by a processor of a computer system, configure the computer system to perform operations comprising:
selecting a style image based on user input that identifies the style image;
generating a synthesized image based on a generator neural network and the style image, wherein the generator neural network is a feed-forward generator neural network and is trained using a loss neural network by:
generating, by different layers of the generator neural network and based on a training image, a first output image at a first resolution and a second output image at a second resolution, wherein the first resolution is smaller than the second resolution, the training image and the style image having a same resolution;
applying the loss neural network to the first output image to generate a first set of output style features;
applying the loss neural network to the second output image to generate a second set of output style features;
generating a first set of training image style features and a second set of training image style features based on the training image and the loss neural network;
determining, by the computer system, a first loss based on the first set of output style features and the first set of training image style features, and a second loss based on the second set of output style features and the second set of training image style features; and
adjusting parameters of different layers of the generator neural network based, at least in part, upon the first and the second losses; and
providing the synthesized image to a user device in response to the user input.

16. The non-transitory computer-readable storage medium of claim 15, wherein the style image is selected from a data store of style images, and wherein the style images are available to the user device based on a user account associated with the user device.

17. The computer-implemented method of claim 1, wherein generating a first set of training image style features and a second set of training image style features comprises:
generating, based on the training image, a first image having a same resolution as the first output image;
generating, based on the training image, a second image having a same resolution as the second output image;

applying the loss neural network to the first image to generate the first set of training image style features; and applying the loss neural network to the second image to generate the second set of training image style features.

18. The computer-implemented method of claim 17, wherein the first image and the second image is generated by down-sampling the training image to respective resolutions of the first and second images.

19. The non-transitory computer-readable storage medium of claim 15, wherein the generator neural network comprises a first set of layers that output the first output image and a second set of layers that output the second output image, the second set of layers comprising the first set of layers.

20. The non-transitory computer-readable storage medium of claim 19, wherein the parameters of the first set of layers of the generator neural network are updated based on the first loss and the second loss and the parameters of the second set of layers of the generator neural network are updated based on the second loss.

* * * * *